Jan. 27, 1948.  C. B. SHREVE  2,435,103
CABINET WITH COMBINED COVER AND SWINGABLE MIRROR
Filed March 18, 1946  2 Sheets-Sheet 1
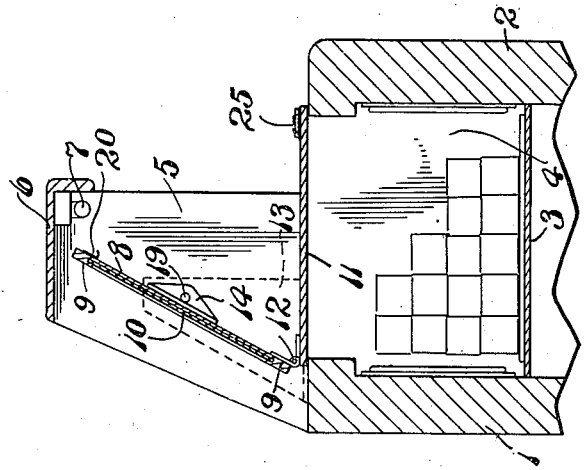
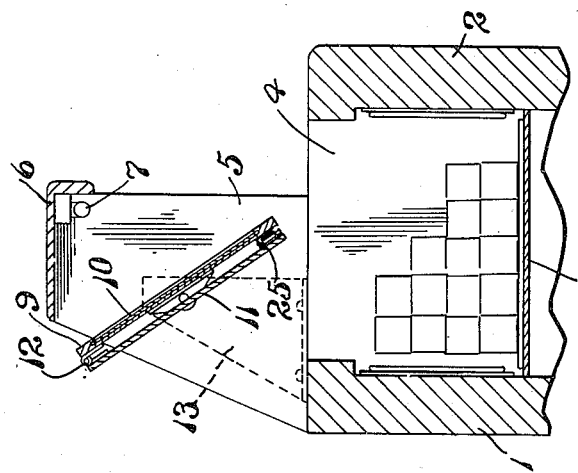
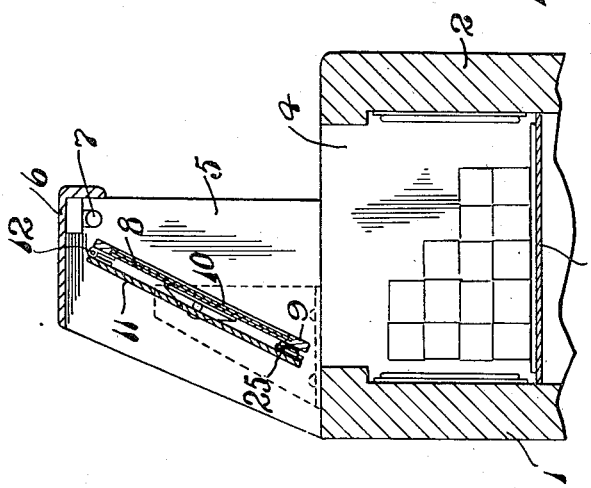
INVENTOR
CLIFFORD B. SHREVE
BY Liverance and
Van Antwerp
ATTORNEYS INVENTOR
CLIFFORD B. SHREVE
BY Liverance and
Van Antwerp
ATTORNEYS Patented Jan. 27, 1948

2,435,103

UNITED STATES PATENT OFFICE 2,435,103

CABINET WITH COMBINED COVER AND SWINGABLE MIRROR

Clifford B. Shreve, Niles, Mich., assignor to Tyler Fixture Corporation, Niles, Mich., a corporation of Michigan Application March 18, 1946, Serial No. 655,257

7 Claims. (Cl. 312—189)

The present invention relates to a novel structure adapted to be placed above the storage compartment of display cases having an open top and in particular in connection with refrigerated self-service cases or cabinets to which a customer may have free access to remove desired merchandise.

Among the objects and purposes of the present invention is to provide a mirror mounted to turn about a horizontal axis, the ends being provided with adjustable friction controlled pivoted mountings, to which, at a longitudinal edge of the mirror frame, a display compartment cover is hingedly connected. With such structure the mirror reflects merchandise in the compartment therefor, either a refrigerated compartment, or one without refrigeration, the merchandise therein normally being located below the customers line of vision.

A further object of the invention is to provide a novel structure of the type noted which may be superimposed on refrigerated or other cabinets of similar structure to provide either front or rear service. The front service permits ready access by the customer at the front of the case or cabinet, while the store attendant may, because of the rotative or pivotal mounting of the cover and mirror, open or close the display compartment or adjust the mirror from the front of the cabinet when, for example, it may be located against a wall or partition. For rear service, the same novel structure is used but is reversed in position to face toward the opposite side with the doors to a lower storage compartment at the back. This allows the store clerk to transfer merchandise stock at the rear from a lower storage compartment to the upper holding and display compartment, by turning the mirror and cover without inconvenience or injury to or startling a customer who might be making a selection at the front of the cabinet.

A further object of this invention is to provide such structure having the rotatably mounted mirror and display compartment cover and mount it within the fixed superstructure of the cabinet which extends above the upper side thereof, whereby changes in the design of the superstructure in the matter of contours, means of illumination, price card moldings, signs or pictorial displays may be freely resorted to without reference to the novel mirror and display compartment cover which may be, if necessary, secured at different positions.

An understanding of the invention may be had from the following description, taken in connection with the accompanying drawings, in which, Figs. 1, 2 and 3 are vertical sections from front to rear of the upper portion of a display cabinet having an open upper side with a novel combined mirror and cover structure of my invention shown in three different positions.

Like reference characters refer to like parts in the different figures of the drawings.

Figure 5:
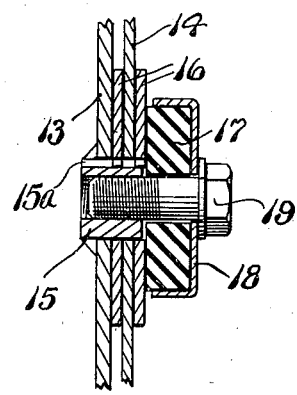
Fig. 5 is an enlarged vertical section through pivotal or rotating mounting of the mirror and cover on the supports therefor, one of such mountings being at each end of the mirror support.

The display and merchandise holding case, which may be refrigerated, and to which my invention is applied has a vertical back 1, a vertical front 2 spaced therefrom and vertical ends. It is provided with a horizontal shelf or partition 3 a distance below the open upper side or top of the cabinet thereby defining a compartment 4, in which merchandise to be shown and sold may be placed, being readily removable from above through the upper open side of the case or cabinet. In cases or cabinets of this character, there is generally a fixed superstructure including vertical ends 5 and a top or shroud 6, said superstructure being open at both front and rear, and in practice lighting means as indicated at 7 may be installed and mounted underneath the front portion of the top, as shown in Figs. 1, 2 and 3.

Figure 7:
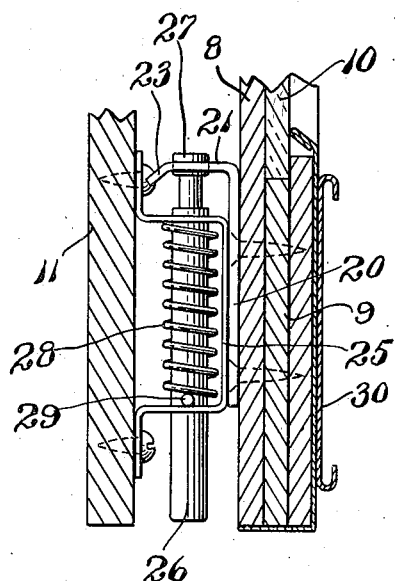
Fig. 7 is a fragmentary enlarged vertical section through the mirror and its support and the cover, illustrating the manually releasable latching means for holding them together.

The novel unit superstructure of my invention includes a supporting frame for carrying a mirror, which has a rectangular back 8 with frame members 9 around it, the mirror 10 being held against said back by said frame members as shown in Fig. 7. Associated with the mirror construction is a cover member 11 hinged adjacent one longitudinal edge, by means of hinges 12 to one of the longitudinal frame members 9, as shown in Figs. 3 and 4. The length of said cover is slightly greater than the length of the top opening to the compartment 4 and, similarly, its width is somewhat greater than the width of said opening. The two members, the mirror mounting member and the cover 11 may be moved to a position in which they lie parallel to each other and releasably secured in such a position by means which will be hereinafter described.

Such connected cover and mirror members are mounted to be turned about a horizontal axis. For such purpose two vertical end supports, as indicated at 13, made of a suitable sheet metal construction are provided, one at each end of the mirror carrying member. Brackets 14 are connected to the back 8 adjacent each end and substantially midway between the opposite longitudinal edges thereof, said brackets lying closely adjacent the vertical portion of the supports 13 and connected therewith as best shown in Fig. 5. An interiorly threaded bushing or nut 15 passes through the inner side of each support 13, and is welded or otherwise permanently secured thereto, over which the rearwardly extending portions of a bracket 14 is passed. The bushing is provided with a longitudinal groove or keyway 15a. Flat metal washers 16 are disposed one between the parts 13 and 14 and the other at the inner side of the bracket, each having a projection which enters the groove 15a in the bushing to hold them against movement. A resilient block of rubber or other similar material is located against the innermost washer 16 and is covered by a metallic cap 18 as shown. A cap screw 19 passes through the bottom of the cap 18 and through the resilient member 17 and screws into the bushing 15. It is evident from the construction described that a frictional resistance to the turning movements of the brackets 14 and the parts which they support is had, such resistance being adjustable by turning the cap screw 19 in one direction to obtain greater resistance and in the other for lesser resistance.

Figure 8:
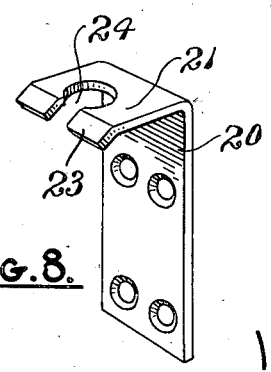
Fig. 8 is a perspective view of the latch keeper mounted at the rear side of the mirror frame or support.

To hold the mirror carrying member and the cover structure releasably together in parallel relation, as shown in Figs. 1 and 2, a latch keeper is secured on the back 8, comprising a flat bar 20, connected by screws or similar fastening to the back, having at one end an outwardly turned flange 21 terminating at its free edge in an angularly disposed lip 23. A keyhole slot 24 is cut from the edge of the lip into the flange 21 as shown in Fig. 8.

On the adjacent side of the cover 11 and near its free edge a longitudinal channel 25 is permanently secured. A rod 26 passes through the opposed sides of the channel 25 and at its inner end portion has an annular groove around it to leave a head 27 of a diameter which will substantially fill the larger inner portion of the keyhole slot 24. A coiled spring 28 around the rod 26 bears at one end against the inner flange of the channel 25, and at the other end against a pin 29, passing through the rod, which pin is pressed against the outer flange of channel 25, as shown in Fig. 7.

The rod 26 with its head 27 is positioned and mounted on the channel 25 so that when the cover 11 is swung toward the back of the mirror carrier, the inner end of the head 27 will ride over the angular lip 23, the diameter of the rod at the inner side of the head being such that it will pass freely through the entrance portion of the keyhole slot. When the head 27 reaches the larger circular portion at the inner end of the keyhole slot it is moved by the spring thereinto as shown in Fig. 7.

The normal position of the mirror and the cover hingedly connected thereto, during working hours in the store, is as shown in Fig. 1. The mirror extends upwardly and forwardly from adjacent the back of the compartment 4 and merchandise in said compartment is reflected in the mirror to the customer at the front. The frictional resistance to turning by reason of the structure shown in Fig. 5 and heretofore described, holds the mirror in any position to which it may be adjusted; and of course the mirror may have the other positions than that shown in Fig. 1 if desired. The rotatably mounted structure, as shown in Fig. 2 may be turned away from the normal position, and access to the merchandise holding compartment 4 may be either from the front or the rear.

Figure 4:
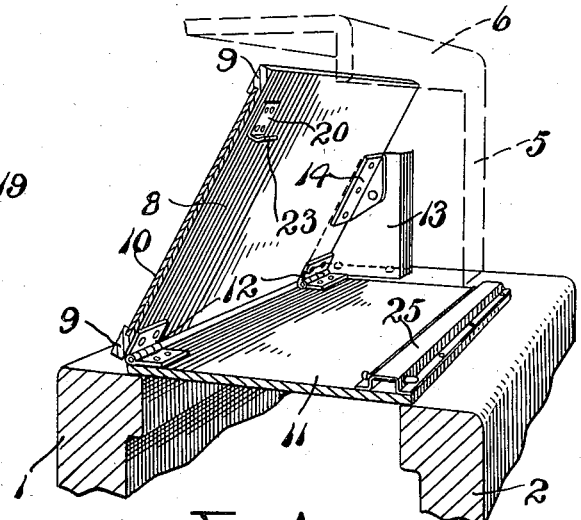
Fig. 4 is a fragmentary vertical section, from front to rear, of the upper portion of the display case or cabinet and with the mirror and cover located with the cover closing the upper open side of the display compartment.
Figure 6:
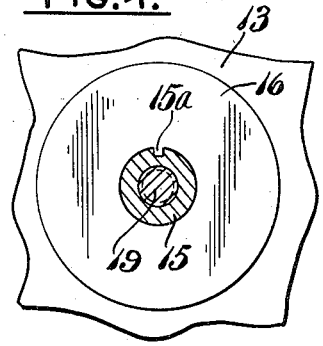
Fig. 6 is a vertical section at right angles to the section shown in Fig. 5 through such pivotal or rotative mounting.

When the upper open end of the compartment 4 is to be closed and covered, the connected together cover 11 and mirror carrying member are turned from the positions shown in Fig. 1 through substantially the arc of 180°. This brings the outer end of the latch rod 26 to a position where it may be pressed against and moved longitudinally to move the head 27 out of the keyhole slot and permit release of the cover 11 from the keeper described, whereupon the cover may be turned downwardly to the position shown in Figs. 3 and 4 to close the upper open side of the merchandise holding compartment 4. This may be done at times desired to exclude dust and to avoid the escape of refrigerated air and the entrance of warmer air to the merchandise compartment. When, for example, in the morning the cabinet is readied for the day's business, it is merely necessary to lift the cover into parallel relation with the mirror holding member, there being an automatic latching of one to the other, and thereafter turn the mirror and its carrying member with the cover 11 through a half turn to substantially the position shown in Fig. 1.

The supports 13 may be secured at their lower ends at any selected position between the front and back of the cabinet on which it is mounted. Through such independence of mounting assembly of the structure described many and various conditions previously mentioned may be taken care of. The frame member 9 of the mirror carrier which is disposed at the lowermost position as shown in Fig. 1 may have an advertising or price card or other indicia removably held thereon in the longitudinal member shown at 30 in Fig. 7.

The construction described has proved very practical and successful and with it all of the objects stated are successfully attained.

The invention is described in the appended claims and is to be considered comprehensive of all forms of structure coming within their scope.

I claim:

1. A display cabinet having an open top, a vertical support mounted at each end of the top of the cabinet, a backing member having a mirror on one face thereof mounted on and between said supports to turn about a horizontal axis, and a top cover member hingedly mounted adjacent one edge to said backing member adjacent an edge thereof, whereby the mirror backing member and said cover member may be located in parallel relation to each other and turned to position the mirror facing forwardly above said open top, or in another position to locate said cover member horizontally over the open top.

2. A construction as defined in claim 1, and releasable latching means for detachably connecting said mirror backing member and cover member for holding them in parallel relation.

3. A construction as defined in claim 1 having an adjustable friction means associated with said mirror backing member and said vertical supports for frictionally resisting turning movement of the mirror backing member about said horizontal axis, and for yieldingly holding it in any position to which adjusted.

4. In a construction as described, a cabinet having an upper storage compartment, with a rectangular opening at its upper side, for holding merchandise and for access thereto through said opening, two vertical supports secured at the upper side of said cabinet, one at each end of said opening, a rectangular mirror-carrying member, brackets secured to the back thereof, one at each end and substantially midway between its longitudinal side edges, a mirror carried on the opposite side of the mirror-carrying member, means pivotally connecting each bracket to its adjacent support whereby the mirror and its carrier may be turned about a horizontal axis to locate the mirror in an upwardly and forwardly inclined position over said opening in the cabinet, and a rectangular covering member hingedly mounted at one longitudinal edge to the back of said mirror-carrying member, at a longitudinal edge thereof, said covering member having dimensions in length and width greater than the length and width of said upper opening in the cabinet.

5. A construction as defined in claim 4, a keeper secured to the back of said mirror-carrying member, and a manually operable latch connected to the adjacent side of said cover member for connecting with said keeper, to hold the mirror-carrying member and cover member in parallel relation to each other, said latch being releasable to permit the covering member to lie in a horizontal position over the opening to said compartment.

6. A construction as defined in claim 4, each of said brackets having a flange extending away from the back of said mirror-carrying member, a horizontal interiorly threaded bushing connected with each of said vertical supports, said bushing extending through the flange of its adjacent bracket, washers around said bushing, one at each side of said bracket flange, a member of resilient material located against the outer washer, a housing for said resilient member and a screw passing through said housing and said resilient member and threading into said bushing, said screw being adjustable to vary the pressure applied thereby to the resilient member.

7. A case or cabinet having vertical end walls and vertical front and back walls with a rectangular opening at its top, providing a compartment for holding merchandise accessible through said opening, a cover member for said opening, a mirror-carrying member, means for hinging said covering member and mirror at adjacent longitudinal edges, means for mounting said mirror-carrying member for turning about a horizontal axis about the upper side of the cabinet, said covering member being movable therewith during such movements, the mirror being located at the side of its carrying member opposite said covering member.

CLIFFORD B. SHREVE.

REFERENCES CITED

The following references are of record in the file of this patent:

UNITED STATES PATENTS

| Number | Name | Date |
|---|---|---|
| 1,699,149 | Mahler | Jan. 15, 1929 |
| 2,093,728 | King | Sept. 21, 1937 |